US006466569B1

United States Patent
Wright et al.

(10) Patent No.: US 6,466,569 B1
(45) Date of Patent: *Oct. 15, 2002

(54) UPLINK TRANSMISSION AND RECEPTION TECHNIQUES FOR A PROCESSING SATELLITEATION SATELLITE

(75) Inventors: David A. Wright, Solana Beach, CA (US); Stuart T. Linsky, San Pedro, CA (US); Donald C. Wilcoxson, Fort Wayne, IN (US); Eldad Perahia, Hermosa Beach, CA (US); Gregory S. Caso, Hermosa Beach, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/408,331

(22) Filed: Sep. 29, 1999

(51) Int. Cl.$^7$ ............................................. H04Q 11/04
(52) U.S. Cl. .................. 370/347; 455/423; 455/427; 455/428; 455/429; 455/430; 714/755; 714/756; 370/314; 370/319; 370/321; 370/347
(58) Field of Search ................................ 455/427, 428, 455/429, 430, 423; 714/755, 756; 370/314, 319, 321, 347

(56) References Cited

U.S. PATENT DOCUMENTS

| | | | | |
|---|---|---|---|---|
| 3,818,442 A | * | 6/1974 | Solomon .................. 340/146.1 |
| 4,847,876 A | * | 7/1989 | Baumbach et al. .......... 375/113 |
| 4,905,235 A | * | 2/1990 | Saburi ........................ 370/95.3 |
| 5,552,798 A | * | 9/1996 | Dietrich et al. .............. 343/893 |
| 5,594,780 A | * | 1/1997 | Wiedeman et al. ........... 379/59 |
| 5,625,624 A | * | 4/1997 | Rosen et al. ................. 370/307 |
| 5,634,190 A | * | 5/1997 | Wiedemen ................. 455/13.1 |
| 5,734,962 A | * | 3/1998 | Hladik et al. ............... 455/12.1 |
| 5,838,728 A | * | 11/1998 | Alamouti et al. ........... 375/265 |
| 5,926,745 A | * | 7/1999 | Threadgill et al. ......... 455/12.1 |
| 6,031,874 A | * | 2/2000 | Chennakeshu et al. ..... 375/262 |
| 6,070,074 A | * | 5/2000 | Perahia et al. .............. 455/430 |
| 6,272,340 B1 | * | 8/2001 | Wright et al. ............... 455/427 |
| 6,279,132 B1 | * | 8/2001 | Linsky et al. ............... 714/755 |

* cited by examiner

Primary Examiner—Daniel Hunter
Assistant Examiner—Stephen D'Agosta
(74) Attorney, Agent, or Firm—McAndrews, Held & Malloy Ltd.

(57) ABSTRACT

Uplink transmission and reception techniques for a processing satellite including one or more earth terminals 400 connected to receive ATM data cells. One or more encoders 418 are connected to coordinate four data cells with an error correction code to generate data bursts and to coordinate the data bursts with synchronizing bursts to generate data frames. One or more modulators 420 are connected to modulate the data frames by frequency division multiple access modulation to enable placement of the modulated data frames into a plurality of channels. One or more antennas 406 transmit the modulated data frames to a satellite 100 over 48 beams with various forms of polarization.

In satellite 100, a receiving multibeam antenna and feed 106 responds to one or more beams of radiocarrier signals having one or more forms of polarization. One or more demodulators 138 demodulate the radio carrier signals into data frames from various channels including a plurality of channel types. One or more decoders 146 decode data bursts and synchronizing bursts from the data frames and decode four data cells from the bursts using error correction code.

57 Claims, 8 Drawing Sheets

UPLINK TRANSMISSION AND RECEPTION TECHNIQUES FOR A PROCESSING SATELLITEATION SATELLITE

BACKGROUND OF THE INVENTION

This invention relates to a processing communication satellite and more particularly relates to uplink reception and transmission techniques for such satellites.

A multibeam processing satellite system requires a comprehensive and consistent approach to its transmission system, including both its uplink and its downlink. Since the uplink and downlink transmission systems are decoupled by the processing (by demodulation, decoding, and switching) on the satellite, these two parts may be defined separately. The uplink transmission system definition must include all aspects relating to the spatial, polarization, spectral, and temporal attributes and, in particular, methods of multiple access to permit many users to utilize the uplink concurrently. Additionally, various data handling issues, including error control and protocol aspects relating to the way that transmission data are organized, must be defined.

BRIEF SUMMARY OF THE INVENTION

The preferred forms of the invention include both uplink transmitting techniques and uplink reception techniques. Regarding the uplink transmitting techniques, a preferred form of the invention is useful for generating and transmitting data in an available spectrum of frequencies suitable for use by a processing satellite. Data cells are provided at one or more earth terminals based on traffic received from one or more user applications. The terminals also provide a synchronizing burst timing signal. Data bursts are generated by coordinating a predetermined number of data cells with a predetermined error correction code, preferably in one or more encoders. The error correction code includes a first error correction code and a second error correction code. The code rate of the first code is a multiple of the code rate of the second code. Data frames are generated from a group of data frame types by coordinating the data bursts with synchronizing bursts timed in response to the synchronizing burst timing signal, preferably by using encoders. Data frames are modulated by a predetermined form of modulation to enable placement of the modulated data frames into a plurality of channels selected from a group of channels having a plurality of channel rates definable in symbols per second, preferably by one or more modulators. The modulated data frames are transmitted over one or more beams with a predetermined form of polarization, preferably by one or more uplink antennas.

The uplink reception techniques are useful for receiving and processing radio carrier signals in an available spectrum of frequencies for use in a processing communication system. One or more beams of the radio carrier signals are received with one or more forms of polarization and modulation, preferably by a reception antenna. The radio carrier signals are demodulated into a plurality of channels including a plurality of channel types having a plurality of channel rates definable in symbols per second, preferably by one or more demodulators. The demodulators demodulate a sufficient number of different frequencies so as to allow up to a predetermined number of bands of frequencies, allow up to a predetermined number of channels of frequencies within each of the bands and allow up to a predetermined number of first subchannels of frequencies or up to a predetermined number of second subchannels of frequencies within each channel. The demodulators also demodulate the channels into data frames including a plurality of data frame types. The data frames are decoded into data bursts and synchronizing bursts, preferably by a decoder circuit. The error correction code includes a first error correction code and a second error correction code. The code rate of the first code is a multiple of the code rate of the second code. Clock signals are generated for timing the demodulation and decoding, preferably by a clock. A synchronizing burst timing signal representative of at least one characteristic of the clock signals is generated, preferably by a signal generator. The timing signal is suitable for transmission to the ground. The decoded data cells are transmitted for further processing, preferably in the satellite.

According to another form of the invention, radio waves are generated for use by a processing communication satellite. The radio waves are generated in one or more beams having one or more forms of polarization and a predetermined form of modulation, and are generated with a sufficient number of different frequencies so as to allow four bands of frequencies and seven channels of frequencies within each of the bands. The channels-have a plurality of channel rates definable in symbols per second and have a channel spacing ratio of about 5/4. The channels also allow five first subchannels of frequencies or 25 second subchannels of frequencies within each channel. The radio waves also are generated to represent data frames having the same duration and defining multiple frequency TDMA channel slots. The data frames have a plurality of data frame types within the channels and subchannels, and the data frame types differ by the number of data bursts and synchronizing bursts transmitted per frame as a function of the channel rates. The radio waves also are generated to represent data bursts and synchronizing bursts within the data frames. At least some of the frames have a number of data bursts which are a multiple of the number of synchronizing bursts. The radio waves also are generated to represent four data cells within the data bursts.

The foregoing techniques offer significant advantages over prior techniques. For example, the preferred forms of the invention permit extensive frequency reuse and permit low power and low cost earth terminals because the modulators and demodulators are organized to allow low speed channels. The modulators and demodulators also are sufficiently flexible to provide for common medium speed usage, such as video conferencing with low end terminals.

The preferred forms of the invention also permit a graceful growth of uplink capacity by concurrent use of multiple frequency channels and deterministic order of transit of uplinked data. The preferred forms of the invention also accommodate existing formats of the pliesiochronous digital hierarchy (PDH) because of higher speed options, and provide two levels of transmission to accommodate adaptation to rain events and to increase usable uplink capacity. The preferred forms of the invention mesh with ATM (asynchronous transfer mode) standards.

The synchronizing bursts of the preferred embodiments provide for continuing time synchronization of terminals whether in the active or standby condition. The preferred frequency placements and symbol rates facilitate digital channelization, and the preferred frequency placement and spectral shaping permit efficient usage of uplink spectrum. In addition, the preferred form of burst format permits coherent demodulation.

The preferred forms of the invention also include error control methods which provide highly efficient usage of uplink power. The time usage techniques provided for in the preferred embodiments permit bandwidth on demand assignments with a small quantum. The described techniques also are well adapted to highly efficient DAMA methods for low duty cycle usage such as "web browsing."

In summary, the preferred forms of the invention provide uplink transmission and reception, as well as radio wave generation, that are highly efficient, versatile, and accurate.

DETAILED DESCRIPTION OF THE INVENTION

Figure 1:
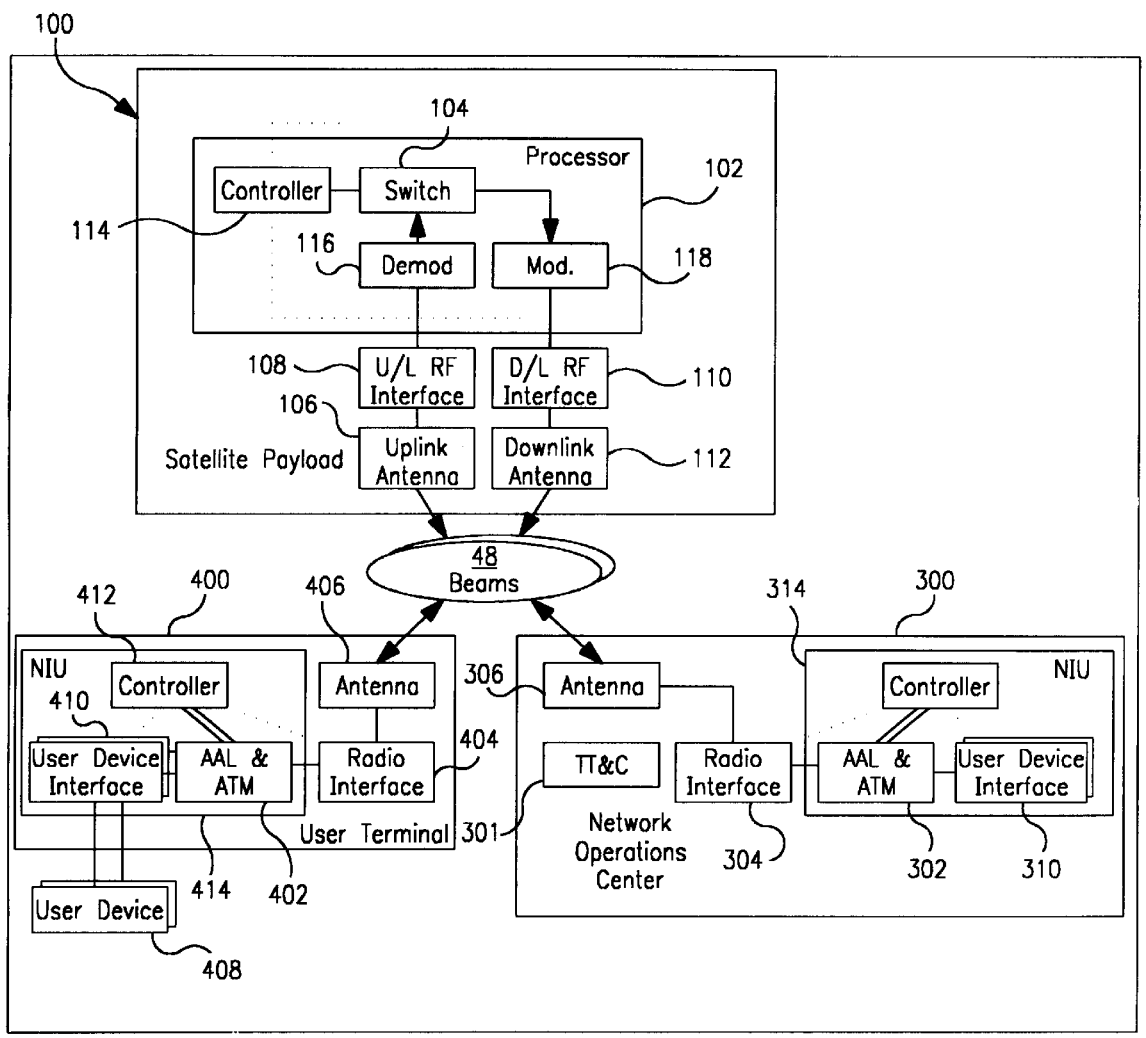
FIG. 1 is a schematic block diagram of a preferred form of transmission and reception apparatus made in accordance with the invention.

Referring to FIG. 1, a preferred form of the invention includes one or more satellites, such as satellite 100, in geostationary orbit. Satellite 100 contains a processor 102 that performs a cell switching function. The processor's controller 114 configures a cell switch 104 based on commands received from one or more ground-based Network Operations Center (NOCs) such as NOC 300. The NOC 300 provides ATM switch management functionality, including control of call admission and maintenance of signaling with one or more User Earth Terminals (UETs), such as UET 400, required to establish an ATM switched virtual circuit.

The payload of satellite 100 is controlled by NOC 300 which may control multiple satellites.

ATM cells transmit user data through the system, from source UET 400 to a destination UET (not shown but functionally identical to source UET 400). This is the primary system flow, starting from the AAL/ATM component 402 within the UET 400; flowing through the UET's RF interface 404 and antenna 406; through the satellite payload's uplink antenna 106 and RF interface 108; switched through the processor 102 through the payload's downlink RF interface 110 and antenna 112; and finally through the destination UET's antenna and RF interface to the destination UET's ATM/AAL component (not shown).

User data is transferred between the system and a user device 408 via the "External User Data" flow. This data flow, which is in a format unique to the user device, yet based on industry standards, is converted into a UET internal format (e.g., a PCI bus) by a user device interface 410 and transferred to the ATM/AAL component 402 where it is reformed into an ATM cell flow. In addition to the transfer of user data, ATM cells are used to transport signaling. This data flow includes the signaling of messages between the controllers located in the NOC 300, payload processor 102 and UET 400. ATM cells are used in this stream for two reasons. First, the satellite payload's controller can exchange messages with any UET and NOC by simply sending an ATM cell with the correct address to the cell switch 104. The controller-switch interface is then just like any other switch port. Second, the multiple access scheme in the UET and NOC must already address the insertion of ATM cells into the transmission subsystem to carry user data. Inserting signaling messages into this data stream is made simpler by using the same ATM cell format.

Control and management signals are provided internal to each component: the terminal controller unit 412 in the UET 400 must signal the RF interface 404 to tune to a particular frequency, for example. The payload controller 114 must collect traffic statistics from the demodulators; telemetry data is collected within the NOC's TT&C 301 and transferred to the satellite 100; the payload controller 114 must configure the switch 104 to route virtual circuits; timing and frequency signals must be passed to many payload components, etc.

UET 400 provides the capability to connect user devices to the network. The term "user device" refers to any communication equipment that conforms to industry standard interfaces, including PCs, telephones, set-top boxes, ATM switches, IP routers, UNIX workstations, etc.

User devices communicate with other user devices, attached to other UETs through the use of ATM switched virtual circuits (VCs). Individual VCs are established and maintained through signaling messages exchanged between NOC 300 and the UET 400. A single UET can support multiple VCs and user devices.

The user device 408 may or may not support the ATM protocols. For non-ATM user devices, the UET 400 encapsulates the user data stream in ATM cells for transmission across the network. The destination UET then recovers the user data stream which is passed to the destination user device.

User device 408 represents a variety of current consumer electronics devices, including personal computers, set-top boxes, interactive game players, and Web-TV devices. These devices interface with the Network Interface Unit (NIU) 414 via industry standard interfaces or "ports" including the RJ-11 telephone jack; PC buses such as EISA, PCI and SCSI; LAN networks such as Ethernet and IEEE 802.3; and video and audio ports.

The external interface components of the NIU 414 provides the mechanical and electrical interface to the user device. Functionally, a unique line interface exists for each type of interface (RJ-11, PCI, 802.3). Physically, a single NIU may include several line interfaces. For example, an NIU may be packaged as a "plug-in" card for a PCI bus and provide RJ-11 and IEEE 802.3 line interfaces.

Component 402 within the NIU 414 is responsible for converting a stream of bits produced by the user device interface into ATM cells. In order to produce ATM cells, this component implements various ATM Adaption Layer (AAL) protocols. It is also responsible for inserting messages produced by the controller into the ATM "stream" and removing ATM cells received from the network destined for the controller.

The controller 412 provides network specific signaling functions. This includes subscriber registration, the establishment of connections between the UET 400 and the network and network management functions.

The radio interface 404 of the UET 400 provides forward error correction (FEC) coding and modulation for data being transmitted to the network and demodulation, de-interleaving and decoding for data received from the network. This includes the framing of ATM cells produced by the protocol adaptation component into multiple frequency TDMA channel slots on the uplink.

The antenna 406 is responsible for radiating energy toward the satellite 100 and collecting energy from the satellite's downlink.

UET 400 can assume many different physical forms. To support a consumer grade terminal, a plug-in PC card may contain the NIU 414 and portions of the radio interface 404, with a cable connecting the card to an outdoor device housing the remainder of the radio interface 404 and the antenna 406.

To support an Internet Service Provider's gateway, UET 400 may consist of one or more 10baseT user device interface cards (each connected to a port on a router), a single board computer to serve as the controller 412, an AAL/ATM card 402 to provide ATM functions, and a separate card to provide the radio interface 404. These cards could all reside in VME chassis and be mounted in the same rack as the router and other ISP equipment.

In each of these examples, the architecture of the UET remains unchanged. Each contains an NIU 414 that interfaces with one or more user devices, a radio interface 404 and an antenna 406. This same architectural philosophy is extended to the network operations center 300. The NOC 300 also contains an NIU 314 where the very same functions present in the NIU 414 are performed. The corresponding devices in NOC 300 bear the same numbers as in UET 400, except that they are in the 300 series, rather than the 400 series.

The central role of the satellite 100 payload is to switch ATM cells from source to destination. In order to switch ATM cells, uplink bursts bearing the cells must be recovered (demodulated and decoded), partitioned into cells, and routed through the switch 104. These functions constitute a "processed payload" in common industry parlance and are provided by the processor 102 in the system architecture.

The processor contains the following components:

A demodulator 116 provides an A/D converter, channelizer and demodulator for each band. The demodulator supports two coding rates: a light code for normal service and a heavy code to compensate for rain loss. Each uplink channel or subchannel is designated as either heavily coded or lightly coded.

The switch 102 performs decoding, ATM cell switching and encoding. The switch is designed to support many incoming and many outgoing ports, each operating at up to the maximum cell rate that can be maintained on the uplink and downlink respectively. Typically, a switch may have 64 incoming and 64 outgoing ports. The 64 ports are divided between 48 to support the uplink and downlink beams, 2 ports connected to each crosslink, 10 ports connected to multicast modules that provide cell duplication and 2 ports connected to the controller.

The controller 114 provides network specific signaling functions. This includes the establishment of virtual circuits through the ATM switch and network management functions.

A modulator 118 performs coding, modulation and signal shaping. Mirroring the demodulator, the modulator supports two coding rates: heavy and light. Each downlink frame may be either heavily coded or lightly coded. Cells received from the switch are designated as either heavy or light and are placed in a downlink frame of the appropriate code type accordingly.

Uplink antenna 106 receives 48 spot beams across at least a portion of 1,000 MHz of spectrum in the 30 GHz band using a 1-in-4 frequency reuse pattern.

Uplink RF interface 108, comprises a bandpass filter to select a frequency band assigned to one of 48 beams. For each band, the uplink RF interface 108 provides a low noise amplifier and a down-converter.

Downlink RF interface 110 comprises an upconverter, traveling wave tube amplifier (TWTA), and waveguide each feeding one 125 MHz band.

Downlink Antenna 112 transmits 48 spot beams across 1,000 MHz of spectrum in the 20GHz band, using a 1-in-4 frequency reuse pattern.

The Network Operations Center (NOC) 300 serves as the "switch manager" for the satellite payload's cell switch. The NOC 300 controls the establishment of each ATM virtual circuit through an exchange of signaling messages with the source and destination UETs.

In its switch manager role, the NOC 300 performs a variety of functions, including: call establishment signaling; cell switch configuration; call admission control; user authentication; user service authorization; address resolution; routing; connection statistics collection; network congestion control; and priority access control.

The components within the NOC appearing in FIG. 1 are summarized below:

Antenna 306 is functionally the same as UET's antenna 406 with the additional capability to transmit and receive TT&C signals. The Ka-band may be used for TT&C, or another band, requiring a different antenna, could be used. Typically, a NOC has a larger antenna 306 than the equivalent for a UET 400.

RF interface 304 is functionally the same as the UET's RF interface 404 with greater performance.

Network Interface Unit 314 is functionally the same as the UET's NIU 414, with greater performance.

Figure 2:
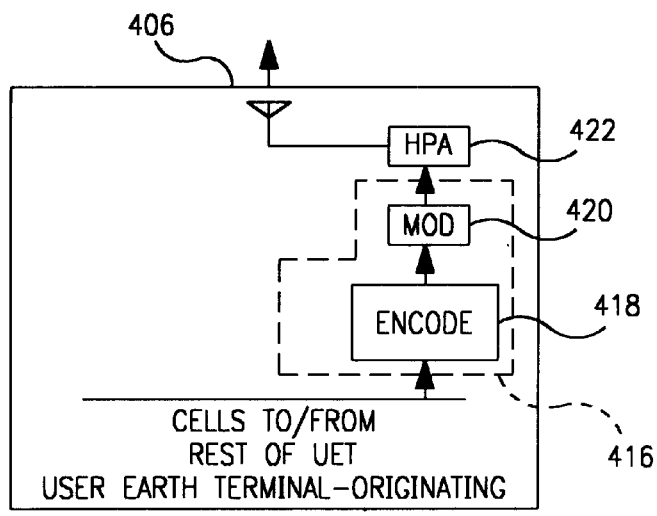
FIG. 2 is a schematic block diagram of a preferred form of uplink transmission subsystem made in accordance with the present invention.

As shown in FIG. 2, RF interface 404 comprises an uplink baseband unit 416 including an encode circuit 418, a modulator 420 and a high power amplifier (HPA) 422.

Figure 3:
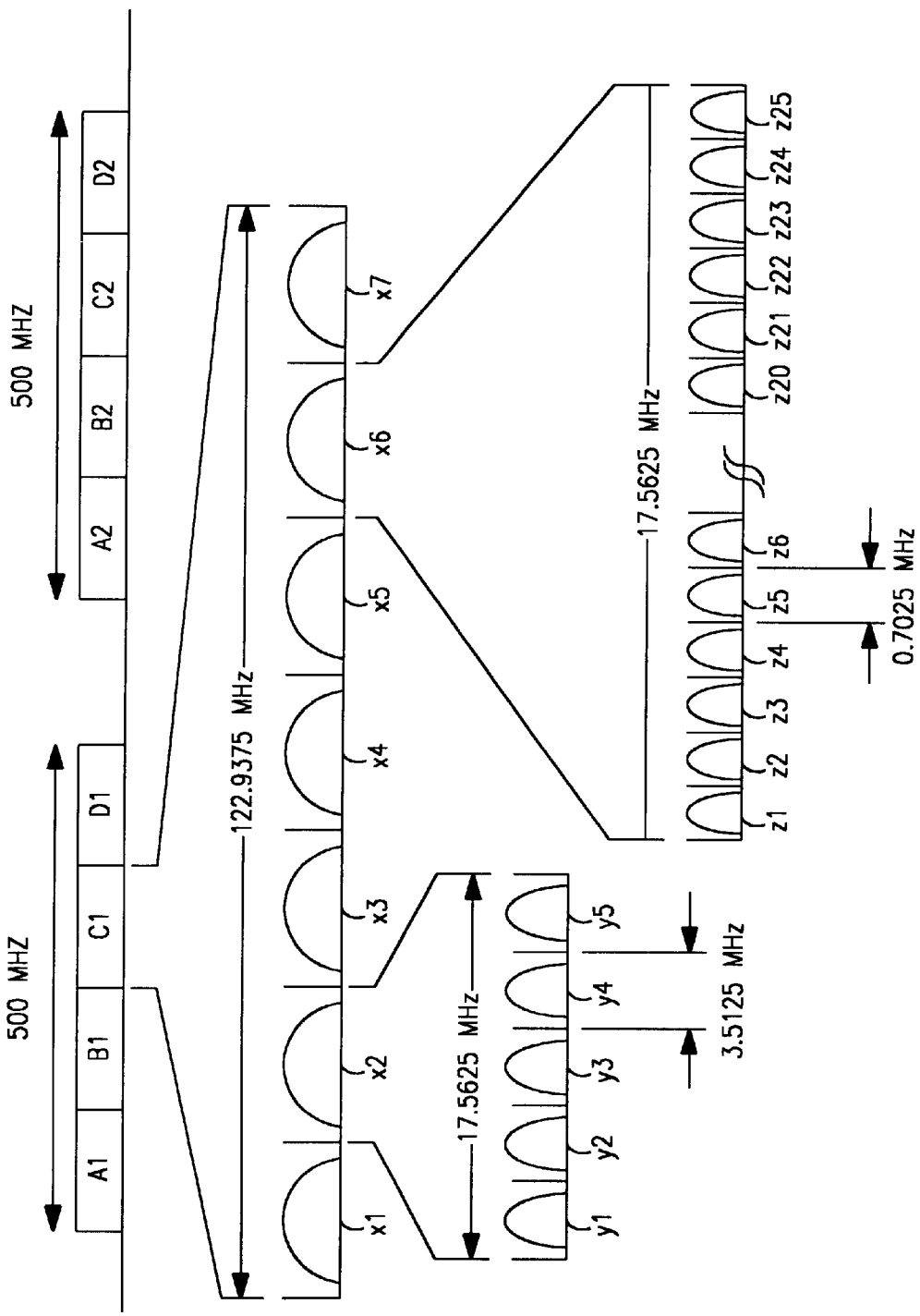
FIG. 3 illustrates a preferred form of frequency layout of uplink channelization made in accordance with the preferred embodiment.
Figure 4:
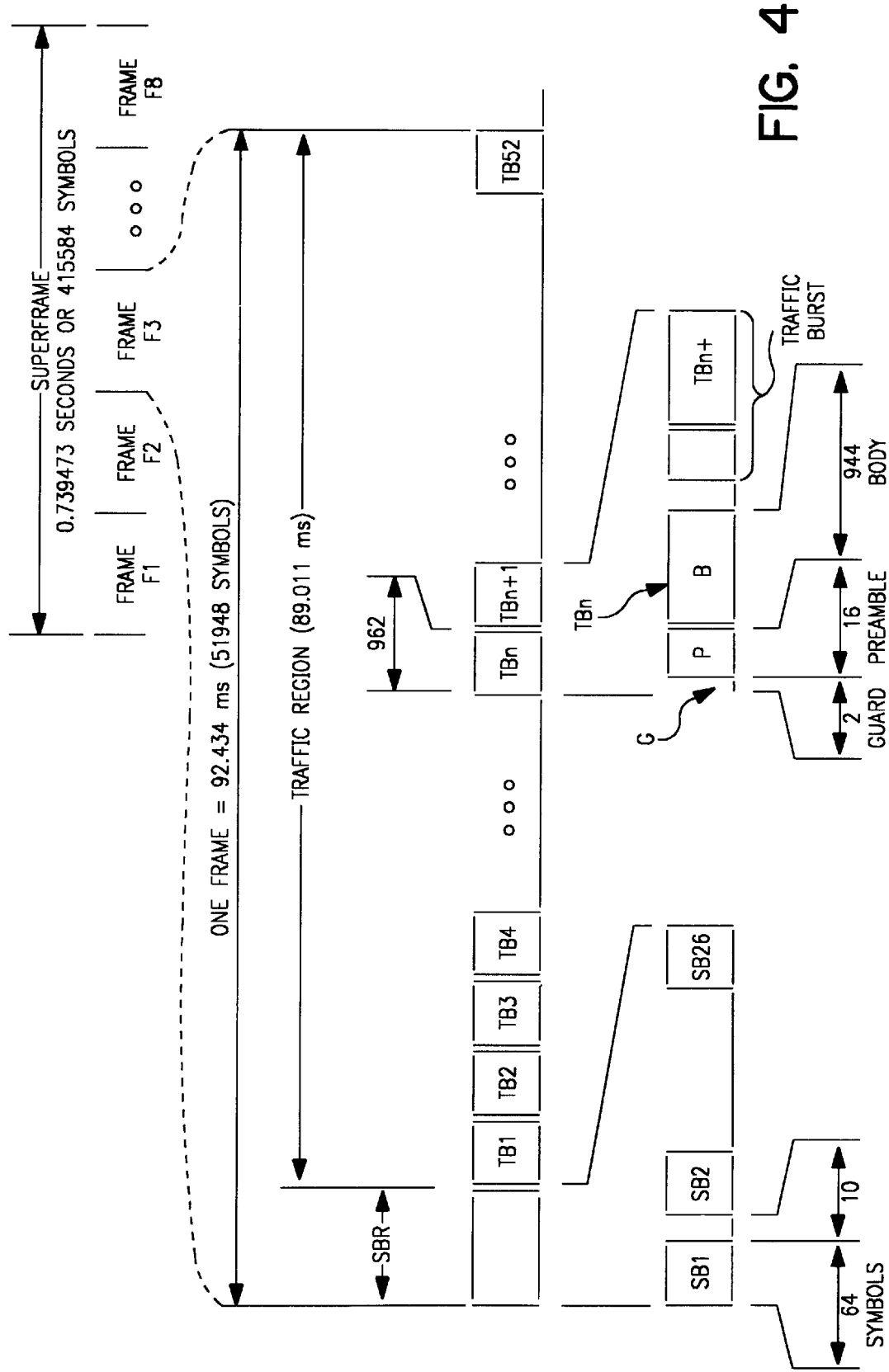
FIG. 4 illustrates a time layout of an uplink frame format in accordance with a preferred embodiment of the invention.

The techniques and parameters constituting the transmission system are illustrated in FIGS. 3 and 4. The techniques detailed below achieve high system capacity multiple-access via a combination of space-division, frequency-division, and time-division approaches which efficiently use the regulatory bandwidth allocation for this service. The modulation techniques selected for uplink use are integrated with forward error correction coding techniques that minimize the required power to close the links given the Ka-band propagation conditions and hardware-driven system cost constraints.

One gigahertz of RF spectrum is available for use by the uplink of each satellite. The allocated spectrum in the Ka-band (30 GHz up and 20 GHz down) is divided into eight bands of 125 MHz each which are used in pairs in each of the forty-eight beams formed by the antenna 406. Typically, four of eight bands are used in a given satellite. A four-frequency re-use strategy among the beam coverage areas results in each of the frequencies being reused 12 times for a 500 MHz RF bandwidth for the uplink for a given satellite. The reuse includes specific frequency bands with a four cell cluster configuration. Each satellite uses circular polarization, either right hand, left hand or both.

Each 125 MHz uplink band is divided into seven subbands, within which may exist a single X channel, or five Y channels or twenty-five Z channels.

Signaling uses "125% square-root raised cosine" pulse shaping on quadraphase phase shift keying (QPSK) at the symbol rates stated below for X, Y, Z type channels within each subband.

Signaling within each subband is in one of three channel types, designated as rate X, Y, & Z, as follows:

(1) Rate X is single carrier of 14.050 megasymbols per second;

(2) Rate Y is a single carrier of 2.810 megasymbols per second being one fifth the rate of an X channel and allowing up to five type Y channels, equally spaced, to exist within a subband; and (3) Rate Z is a single carrier of 0.562 megasymbols per second being one twenty-fifth the rate of an X channel and allowing up to twenty-five type Z channels, equally spaced, to exist within a subband.

A feature of the subject transmission is that the symbol rates for the uplink are related by simple divisors to the downlink symbol rate which, in the preferred embodiment, has a downlink symbol rate of 98.35 megasymbols per second. The divisors for the X, Y, & Z cases referred to above are, respectively, 7, 35 & 175 which yield, respectively, the symbol rates 14.050, 2.810, and 0.562 megasymbols per second, as referred to above. These precise relationships facilitate precision clocking of the uplink demodulators.

Another feature of the subject transmission method is that the channel spacing ratio is an integer ratio, being 5/4 or 125% in the preferred embodiment. The inter carrier frequency spacing is 17.5625 MHz for X channels, 3.5125 MHz for Y channels, and 702.5 KHz for Z channels. These precise placements facilitate separation of the various signals in a band by the satellite channelizer. The channel spacing ratio is the inter carrier frequency spacing in MHz divided by the symbol rate in megasymbols per second.

Multiple access is provided by means jointly of frequency division (with channelization as described in the paragraph above and subparagraphs (1)–(3) above) and of time division (with slotting as described in the paragraphs (4)–(6) immediately below).

There are six distinct time frame organizations, two for each of the three types of frequency channelizations, depending on the type of coding heavy "H" or light "L" in use on the channel. Thus, there are frame types XH, YH, ZH, XL, YL, ZL. All frame types have a common duration of 92.434 milliseconds.

(4) Frame types XH and XL span 1,298,700 symbols and contain 650 slots for synchronization bursts. Type XH and XL have, respectively, 650 and 1300 slots for traffic bursts.

(5) Frame types YH and YL span 259,740 symbols and contain 130 slots for synchronization bursts. Type YH and YL have, respectively, 130 and 260 slots for traffic bursts.

(6) Frame types ZH and ZL span 51948 symbols and contain 26 slots for synchronization bursts. Type ZH and ZL have, respectively, 26 and 52 slots for traffic bursts.

A dedicated slot for transmission of a synchronization burst of 64 symbols in a 74 symbol slot is provided for each active or standby terminal at intervals of 8 frames into one of 650, 130, and 26 synchronization slots on each channel of type X, Y and Z, respectively. These bursts are BPSK symbol sequences derived from a maximal length feedback shift register sequence and bear no information otherwise. Different phases (i.e., cyclic rotations) of the basic sequence are used in different beams of the same color.

Transmitted bursts comprise 1888 block coded symbols plus a 32 symbol preamble for frame types XH, YH, ZH, and 944 symbols plus a 16 symbol preamble for frame types XL, YL, and ZL.

The blocks of symbols are organized as four ATM cells, each of 53 bytes, together with 24 bytes of redundancy to form a (236, 212) Reed-Solomon outer code, which may be sent as lightly coded blocks. Such lightly coded blocks occupy 944 symbols.

To form a heavy code block, a light code block is subjected to further encoding such that 4 bit nibbles of the block are expanded to an 8 bit byte using a so-called Reed-Muller code to yield a biorthogonal signal set over four QPSK channel symbols. Such heavily coded blocks occupy 1888 symbols.

Initial entry (also known as entry order wire or EOW) signaling is based on usage of a traffic slot in a ZH type channel and has a burst structure comprised of a 320 symbol pattern derived from a maximal length shift register sequence to which is postfixed a short coded message that identifies the terminal entering the system.

Except for the initial entry bursts and the synchronization bursts, all uplink communications, including control, are achieved using traffic bursts bearing ATM cells.

As shown in FIG. 3, a 1 GHz spectrum of available frequencies is divided into two 500 MHz bands. The first 500 MHz band is divided into 125 MHz bands A1, B1, C1 and D1. The second 500 MHz band is divided into 125 MHz bands A2, B2, C2 and D2. Typically one band is used for a given satellite.

A representative 125 MHz band C1 within the allocated Ka-band spectrum is shown. This frequency serves a given area of antenna coverage (a ground cell) on a particular polarization. The C1 band is divided into seven sub-bands X1–X7, as shown, each with a bandwidth of 17.5625 MHz. Each such sub-band may be used in one of three channelization modes. In modes X, Y, & Z the subband accommodates one X, five Y, or twenty-five Z channels, at 14.050, 2.810, or 0.562 megasymbols per second, respectively. Within a subband, the multiple Y and Z channels are centered on frequencies separated by 3.5125 MHz and 0.7025 MHz, respectively. For example, channel X2 is shown divided into 5 Y channels Y1–Y5, and channel X6 is shown divided into 25 Z channels Z1–Z25.

In FIG. 4, the time structure of the uplink transmission system is depicted. The diagram is specific to a ZL channel. The other five channel types have somewhat different structure. Dimensions are in symbols. Time is organized into super frames of duration 0.739473 seconds or 415,584 symbols consisting of eight frames, F1–F8, each of 92.434 milliseconds duration. Uplinking terminals access their synch burst slots once per masterframe and traffic burst access is once per frame for each traffic slot allocated to the terminal. Each frame consists of two regions, a synch burst region SBR (3.423 ms) and a traffic burst region TBR (89.011 ms). The duration of the SBR and TBR is the same for all six frame types. The number of slots in each region depends on the channel type. FIG. 4 shows specifically the ZL case, for which there are 26 synch burst slots SB1–SB26 and 52 traffic burst slots TB1–TB52. The YL subchannel carries five times as many synch burst slots and traffic burst slots as the ZL subchannel. The XL channel carries 25 times as many synch burst slots and traffic burst slots as the ZL subchannel. Other cases are similar, but differ in the number of traffic bursts and synch bursts. FIG. 4 also shows that synch bursts, such as SB1, are 64 symbols in duration and are accommodated in 74 symbol slots. Synch bursts have the same structure for both light and heavy code channels. The synch bursts are generated at times determined by synchronizing burst timing signals received from downlink antenna 112 (FIG. 1). Additional details about such timing signals are described in the application entitled "Synchronization Method For A Processing Communication Satellite," TRW Docket No. 22-0056, filed herewith in the names of David A. Wright, et al. which is incorporated by reference into this application and is assigned to the same assignee.

FIG. 4 shows in more detail light code traffic burst TBn which is made up of a body B of 944 symbols corresponding to four ATM cells after coding by a Reed-Solomon (236, 212) code and a preamble P of 16 symbols or 960 symbols total. A guard band G of 2 symbols duration precedes preample P. Light code traffic bursts are accommodated in slots of 962 symbols. For channels used with heavy code, the number of symbols is doubled, and the burst body bears the same four cell outer codeword, but with each nibble thereof expanded to a byte through the (8,4) biorthogonal inner code. The code rate for the light code is a multiple of the code rate for the heavy code. Preferably the multiple is two.

The precise range of frequencies allocated by the Federal Communications Commission (FCC) for commercial Ka-band operations in the Fixed Satellite Service (FSS) for the USA is 28.35 to 28.60 plus 29.250 to 30.000 GHz for the uplink and 19.2 to 20.2 GHz for the downlink. For non-USA coverage areas following ITU regulations (typically served by a separate satellite), the uplink allocation is 29.00 to 30.0 GHz in a contiguous band. The total bandwidth allocation is 1000 MHz each for both uplink and downlink service.

As used by satellite 100, the allocated spectrum is divided into eight bands of 125 MHz each. The bands are coupled in four sets of two for use in the four categories ("colors") of beams present in the geographical coverage pattern. These bands and their associated colors are set out in Table 1:

| U/L Band ID Color | Uplink Band Range, GHz |
|---|---|
| A1 | 28.350–28.475 (FCC) |
| | 29.000–29.125 (ITU) |
| A2 | 28.475–28.600 (FCC) |
| | 29.125–29.250 (ITU) |
| B1 | 29.250–29.375 |
| B2 | 29.375–29.500 |
| C1 | 29.500–29.625 |
| C2 | 29.625–29.750 |
| D1 | 29.750–29.875 |
| D2 | 29.875–30.000 |

Satellite 100 uses circular polarization on both the uplink and the downlink. The polarization is right hand, left hand or both. All transmissions from and to a single satellite are co-polarized across the entire spectrum, with the opposite handedness being used for transmit and for receive. The concept of operations permits the option of placing a second satellite using the orthogonal polarization at the same longitude, with the same frequency coverage, and the same geographical coverage to double the frequency reuse.

Figure 5:
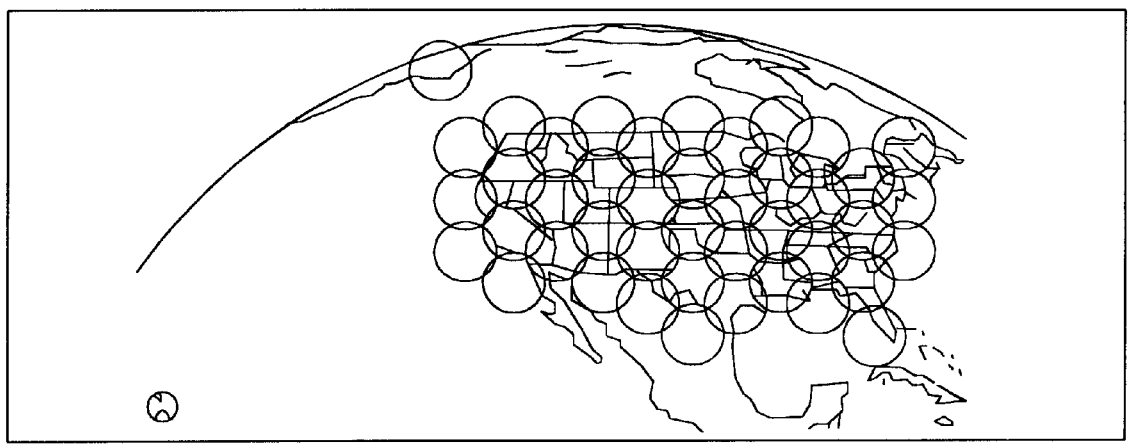
FIG. 5 is an illustration of a preferred form of beam lay down pattern for use in connection with the preferred form of the present invention.

Satellite 100 uses multiple spot beams to permit high quality link performance via cellular beam coverage areas with higher gains and to obtain frequency re-use where spatial isolation among beams allows the same frequency band to be used for multiple areas. In a representative beam layout for the geographical coverage area of the contiguous, continental United States (CONUS), there are 48 beams with coverage as shown in FIG. 5.

Satellite 100 achieves high spectral efficiency by using each band of frequencies repeatedly across the geographical coverage area. In the representative beam layout illustrated in FIG. 5, there are four distinct classes of beams (i.e., A, B, C, and D for the uplink.) Each class has twelve members for a forty-eight beam geographic coverage, and is referred to as a "color" with each beam in the color using the same pair of bands.

Figure 6:
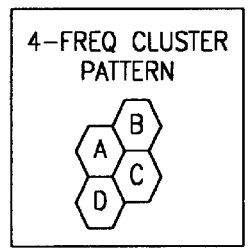
FIG. 6 illustrates a preferred form of multibeam coverage pattern enabling frequency reuse in accordance with the preferred form of the invention.
Figure 6:
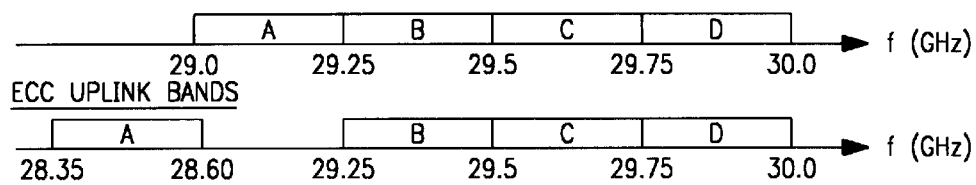
Figure 6:
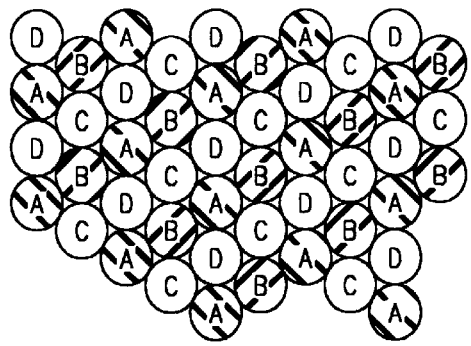

FIG. 6 shows how hexagonal beam tessellation using a cluster of four frequencies can be used to construct a 48-beam pattern. For an irregular overall pattern, there may be an unequal distribution of the four frequencies which depends on the pattern's shape, as shown for example by the CONUS coverage of FIG. 6.

For a single satellite 100 with a regular coverage pattern (FIG. 6), each of the four pairs of uplink and downlink frequency bands is re-used 12 times in the 48-beam coverage area by spatial frequency re-use: that is, a total of 6.0 GHz of bandwidth is available at the satellite for both the uplink and the downlink. When a pair of satellites using circular polarization operates from the same geostationary orbital location into the same geographical area, polarization frequency reuse will double the re-use factor to 24.

Satellite 100 relies on a negligible probability of bit error subject to a discarded cell ratio of a few parts per million when a communication link is at the threshold of performance. This high integrity approach is realized by the use of powerful error control techniques.

A central consideration in the design of a Ka-band system is the need to provide a substantial link margin to accommodate the effects of rain, which become quite severe at these frequencies. This margin is attained in the satellite 100 by applying a second level of error control. Since the additional margin is needed only part of the time, this second layer of coding is deployed adaptively, so that the additional bandwidth required to support it does not penalize UETs operating under clear sky conditions. Additional details about such adaptive coding is explained in U.S. Application Ser. No. 09/163,775, filed Sep. 30, 1998 in the names of David A. Wright et al., entitled "Adaptive Coding Scheme For A Processing Communications Satellite," TRW Docket No. 22-0011, which is incorporated by reference and is assigned to the same assignee as the present application.

To achieve reasonable efficiency between payload and overhead components and to permit strong error control codes to be exploited, it is necessary to aggregate a few cells together into a composite uplink block. To avoid excessive latency, it is important that the number of cells so aggregated not be too large. Blocks of four cells offer superior performance. Since each cell typically has 53 bytes, the basic information content of each block is 212 bytes.

Each 212 byte (or octet) information block is adjoined with 24 bytes of parity to form a codeword in a (236,212) Reed-Solomon error correcting code. This code has the property that all patterns of 12 or fewer byte errors are correctable when the received version of the 236 bytes is subjected to decoding by a standard BCH decoding algorithm. As a side benefit, the decoding process almost always detects the presence of more than 12 errors with the result that such undecodable cases may be discarded rather than risk misdirection of the cells contained therein.

The outer code is based on a threshold byte error rate prior to decoding of 1.2%. For this input error rate, the probability that 12 or fewer errors are present in a block of 236 bytes may be shown to be about 7 parts per million, which is the threshold cell loss rate due to channel imperfections.

The link design calls for routine operation at one decibel above threshold, at which point the input error rate drops to about 0.24% and the concomitant probability of undecodability drops to less than 1 part per trillion. As noted above, the probability of decoding a block incorrectly is so small as to be negligible, even at threshold.

Inner coding is applied to the uplink and downlink for UET 400 on an as-required basis to form heavy code blocks For lightly coded traffic, no inner coding is applied. When required to mitigate unfavorable link conditions, a rate ½ inner code is used on the uplink.

The preferred form for the uplink inner code is a short binary block code of rate ½. Short block codes are preferred over convolutional codes in this application because the usual strategy of interleaving to break up the clusters of errors that appear when a convolutional code is decoded by a Viterbi decoder is impractical for the low speed uplinks typical of low cost earth terminals because of excessive latency. One form of block code that is satisfactory for the subject transmission is known in the literature as the "Nordstrom-Robinson". This code has a minimum distance of 6. When decoded with soft decisions using the Chase Algorithm, this code has a byte error rate of 1.2% when the input energy per component to noise ratio (Ec/No) is 0.5 dB (theoretical ideal).

Another suitable form of block code that is suitable for the inner code is the (8,4) Reed-Muller code which forms a biorthogonal signal set and which yields a byte error rate of 1.2% for Ec/No=1.5 dB. In the preferred embodiment, this biothogonal code is intended as the inner code.

A frame structure is imposed in both the uplink and the downlink satellite 100. The downlink frame structure permits the separation of the heavily and the lightly coded portions of the downlink and forms part of the overall synchronization system that ensures the uplink bursts arrive at the satellite with a highly precise time placement. The uplink frame structure serves to define individual channel slots "chanslots" in each of the uplinking channels including multiple frequency TDMA channel slots.

The frame is divided into various channel slots as shown in FIG. 4. Each channel slot may be occupied by a burst of the same nominal number of symbols and comprised of a 36 (18) symbol preamble and a 1888 (944) symbol body for heavily (lightly) coded channels, respectively.

In the preferred embodiment, the preamble includes an all-purpose synchronization sequence of 32 (16) symbols and a guard time of 4(2) symbols for heavy (light) coded channels, respectively. The body of the burst contains the 236 byte Reed-Solomon coded block in the case of lightly coded channels (944=236*8/2) and where each QPSK symbols bears two bits of the coded block. The body of heavily coded bursts is twice as long (1888=944*2) due to the application of the inner code for the heavily coded case—equivalently, the body is comprised of 472 code words of the biorthogonal inner code, each of 8 bits or 4 symbols, and associated in nibble pairs with the bytes of the Reed-Solomon code.

There are no overt frame markers present in the uplink since the uplink frames are defined in terms of satellite timing as conveyed to the UETs via a time-stamp present in the downlink frame and by range information.

Square-root raised cosine pulse shaping with a roll off factor of 25% on phase shift keying (QPSK) is the basis of uplink signaling. The signaling rate (symbol rate) is in the ratio of 175, 35, and 7 to 1 between the 98.35 megasymbols/sec. downlink and the 562, 2810, 14,050 K symbols/sec. uplinks, respectively.

The uplink preamble serves to permit the satellite demodulator to acquire the phase of the burst arriving on the uplink and provide guard time. The length of the preamble for use with heavily coded blocks (36 symbols) is twice that for lightly coded blocks (18 symbols) to maintain a two to one occupancy ratio between the two modes and to accommodate the significant difference in setpoint power (and signal to noise ratio) for these two modes. Additional details about synchronizing the operation of satellite 100, NOC 300 and UET 400 is described in TRW Docket No. 22-0056, entitled "Synchronization Method For A Processing Communication Satellite," filed herewith in the names of David A. Wright et. al., and which is incorporated by reference and which is assigned to the same assignee as the present application.

Figure 7:
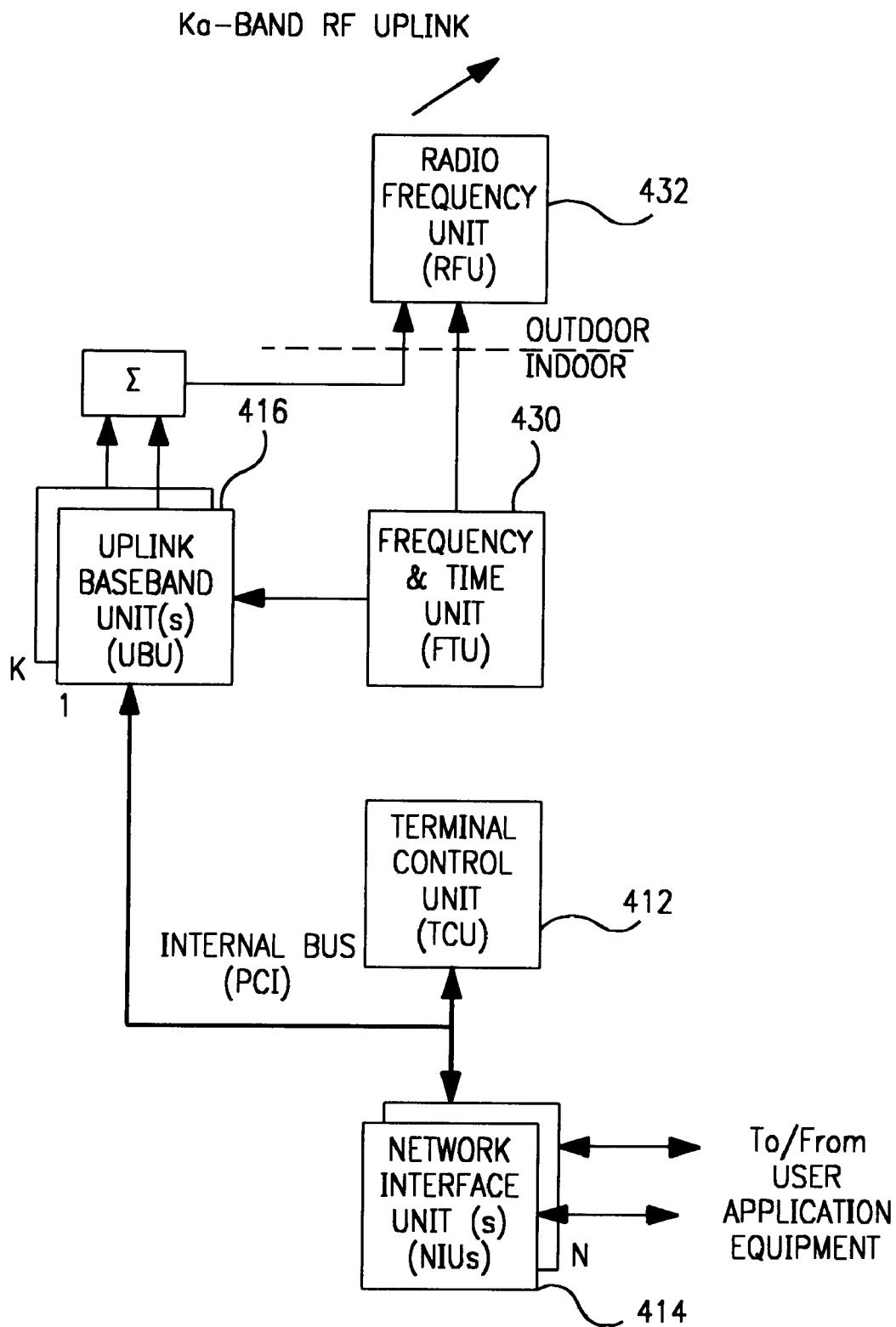
FIG. 7 is a schematic block diagram illustrating a preferred form of earth terminal uplink transmission equipment made in accordance with the invention.

Referring to FIG. 7, under direction from the UETs Terminal Control Unit (TCU) 412, ATM cells (53 bytes each), are placed on the internal bus of UET 400 just prior to the launch time of an uplink burst. These cells may originate from any of the Network Interface Units (NIUs) 414 present in the UET for which connections are currently established and/or may emanate from TCU 412 itself. In the event that four cells are unavailable to fill a scheduled burst, the TCU 412 will create null cells to fill out the block. Cells placed on the bus are routed to a specific Uplink Baseband Unit such as unit 416 (FIG. 2). (Smaller stations will have only a single Uplink Baseband Unit.) All uplink addressing (VPI/VCI) assignment and other constituents of the cell header (i.e., the PTI and CLP fields) are completed prior to presentation of a cell to the uplink transmission process.

After receiving four cells from the bus, the Uplink Baseband Unit (UBU) 416 buffers these as a single block of 212 bytes which forms the information component of a Reed-Solomon codeword. These 212 bytes are processed by a Reed-Solomon (RS) encoder 418 in the UBU (FIG. 2) to produce a 24 byte parity suffix which is adjoined to the information component to form a 236 byte RS codeword. This codeword forms the body of the uplink burst when light coding is used or is passed to the inner encoder for further encoding when heavy coding applies.

For heavily coded uplinks, the Reed-Solomon codeword is encoded further using the biorthogonal inner code encoder. This encoder operates on a nibble (half byte) basis to convert each byte of the RS code to a pair of encoded biorthogonal words of one byte each. This doubly encoded block of 472 bytes total forms the body of the burst when heavy coding applies.

After uplink encoding processes are completed, the burst body is reorganized as a dibit stream for presentation to the I,Q paths of the uplink modulator 420 (FIG. 2) in UBU 416 which will convert the dibits to QPSK symbols. A diagram of the uplink format and modulation timing is shown in FIG. 4. Prior to passage to the modulator, the uplink burst assembly process is completed by prefixing a preamble sequence to the body of the burst. The nominal length of preamble is 18 (36) symbols for the lightly (heavily) coded case. (Some of the preamble symbols are actually null to provide guard time.) At this point the burst length is nominally 962 (1924) symbols for the lightly (heavily) coded forms, respectively.

At a precise launch instant (determined by the UET's synchronization function) the UDU 416, commences to feed the burst into the modulator 420 at a rate of one dibit every 1.78 microseconds (562 kHz).

The modulator 420 produces a shaped QPSK signal version of the burst using the burst dibit input described above which is translated to a first IF frequency. The symbol intervals are determined precisely using a divided down (by 175, 35, or 7) version of the UET's internal 98.35 MHz downlink symbol clock. Uplink power control also is effected at this point in the processing path by adjusting the level of the first IF in steps of approximately 0.125 dB as directed by the power control algorithm within the UET 400.

Each UBU in UET 400 has a frequency synthesizer in the Frequency and Time Unit (FTU) 430 (FIG. 7) which can produce any one of 175 (or 35 or 7) separate local oscillator frequencies on 0.7025 MHz spacing—to facilitate placement of a burst into its assigned uplink channel. These synthesizers have a stabilization time of less than the shortest uplink burst (1.718 ms for lightly coded bursts) so that many channels may be accessed within a frame period (92.434 ms). The uplink burst at first IF is converted to a second, channelized, IF using this synthesized LO frequency. For UETs with multiple uplink capability, these second IF signals are combined into a composite IF by means of a power combiner. The second IF signals are in the range of 950 to 1200 MHz and are transported from the indoors portion of the UET 400 to the outdoors part 432 by means of a coaxial cable.

At the outdoor unit 432, the composite IF is unconverted to the appropriate uplink frequency band (in the vicinity of 30 GHz) for the UET in a block upconversion process. The local oscillator for this upconversion is switch selectable to any of the eight bands used by the satellite 100.

The uplink 30 GHz signal is amplified by means of the UET's HPA 422 (FIG. 2) to a suitable level for propagation to the satellite 100. For smaller stations, HPA 422 is a 2 watt solid state amplifier (rating at the one dB gain compression point). For larger capacity stations using the smallest aperture antenna, the HPA will be a 30 GHz range traveling wave device with a rating of approximately 7+10*log(K) dBW, where K is the number of Z type UBUs required to support the station's peak uplink rate. Terminals for Y or X type uplinks will use different power ratings for their HPA.

For example, for a "T1" class terminal, four UBUs are required and the traveling wave tube (TWT) rated saturated power should be about 13 dBW or, equivalently, 20 watts, which provides for 4 dB output backoff to accommodate multicarrier operation without significant intermodulation effects. Note that the typical operating level for the HPA 422 is much lower than its rated value since power control is maintained in the uplink, and the full amplifier power is required only rarely under conditions of heavy rain. Note also that the HPA 422 rating may be reduced with larger aperture antennas as would typically be the case for high availability UETs.

The HPA's output is coupled into a 30 GHz waveguide and into the transmit port of the antenna's feedhorn assembly. The feedhorn illuminates the antenna parabola which collimates the uplink energy into a narrow beam for upward propagation. The minimum antenna size is 75 centimeters, which is applicable only to moderate availability UETs.

The uplink signal then propagates to the satellite 100 subject to spreading losses, absorption, and rain fading.

Figure 8:
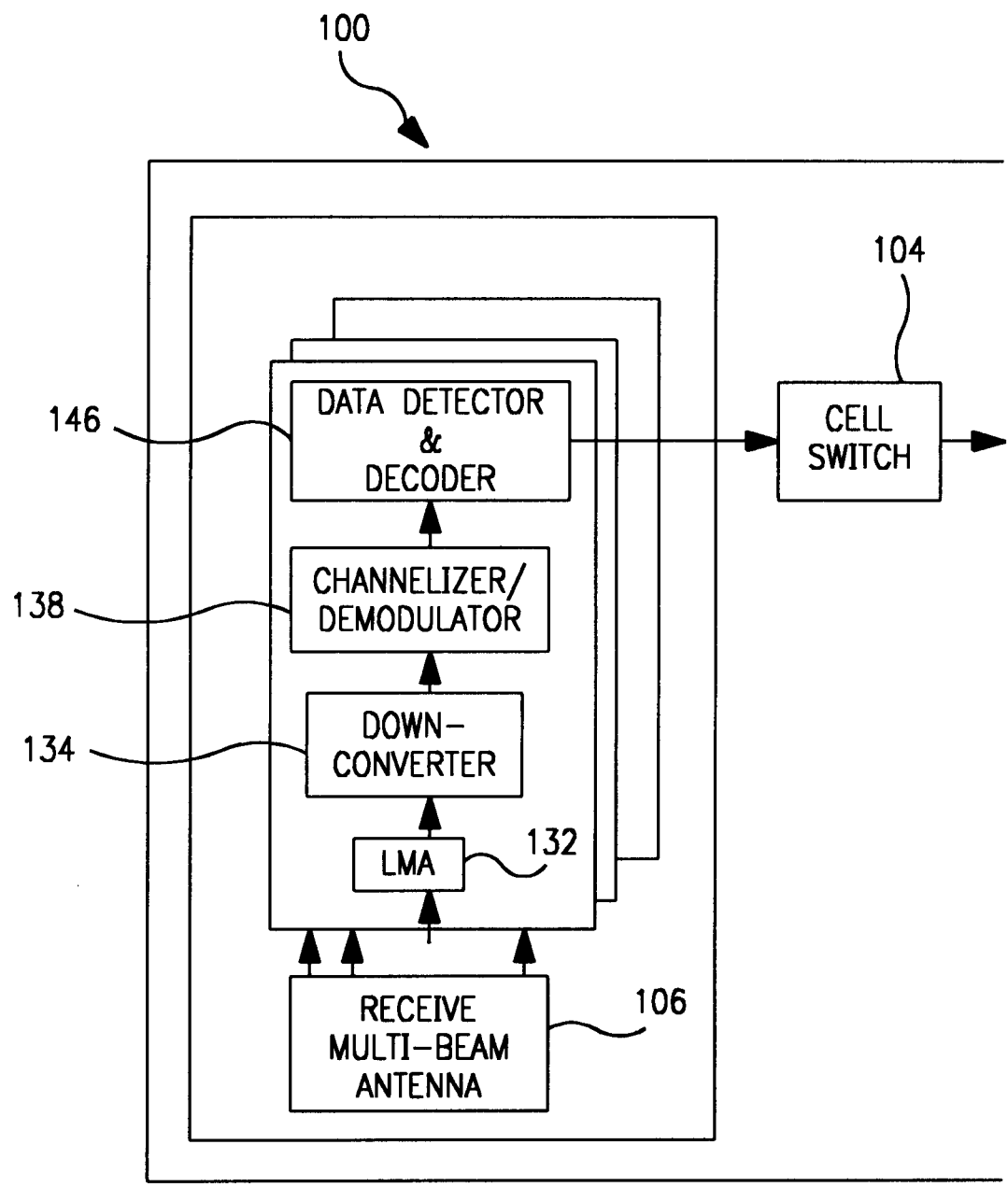
FIG. 8 is a schematic block diagram of a preferred form of satellite reception apparatus made in accordance with the present invention.

This uplink transmission activities occurring in the satellite 100 and the equipment enabling these activities are described with reference to FIGS. 8 and 9.

The uplink signals from concurrently active channels (125 MHz band) are collected by one of the satellite's 30 GHz uplink antennas 106 and the feed element associated with the uplinking beam. These signals arrive from various directions relative to the center of the beam and with power levels that are higher for off-axis locations than for mid-beam (to compensate for receive antenna gain rolloff at the edge of coverage). After collection by the antenna 106 and feed combination, however, all heavily coded signals excite approximately the same power level per channel at the input to the low noise amplifier (LNA 132) for the band as a result of the power control procedure. Similarly, all lightly coded channels have a common power level at the LNA, but this power level is several dB higher than the heavily coded power level (typically 7 dB) because of the differing values of Ec/No at the setpoint and the increased interference experienced with the light code. The feed elements enable the satellite to separate beams originating from different locations on the earth in a well-known manner.

The incoming band of 30 GHz signals from the antenna feed is passed through low noise amplifier 132 in preparation for further processing of the uplink signals. The amplifier provides initial gain and, together with other noise sources, results in a satellite system temperature of approximately 800° Kelvin.

The 125 MHz band signal output from LNA 132 is then downconverted in a downconverter 134 from the 30 GHz region to an intermediate frequency by means of a down converter mixer 135 (FIG. 9) which reduces the carrier frequency to an intermediate (IF) frequency and an IF band pass filter 136 prior to presentation to the satellite channelizer demodulator 138.

Figure 9:
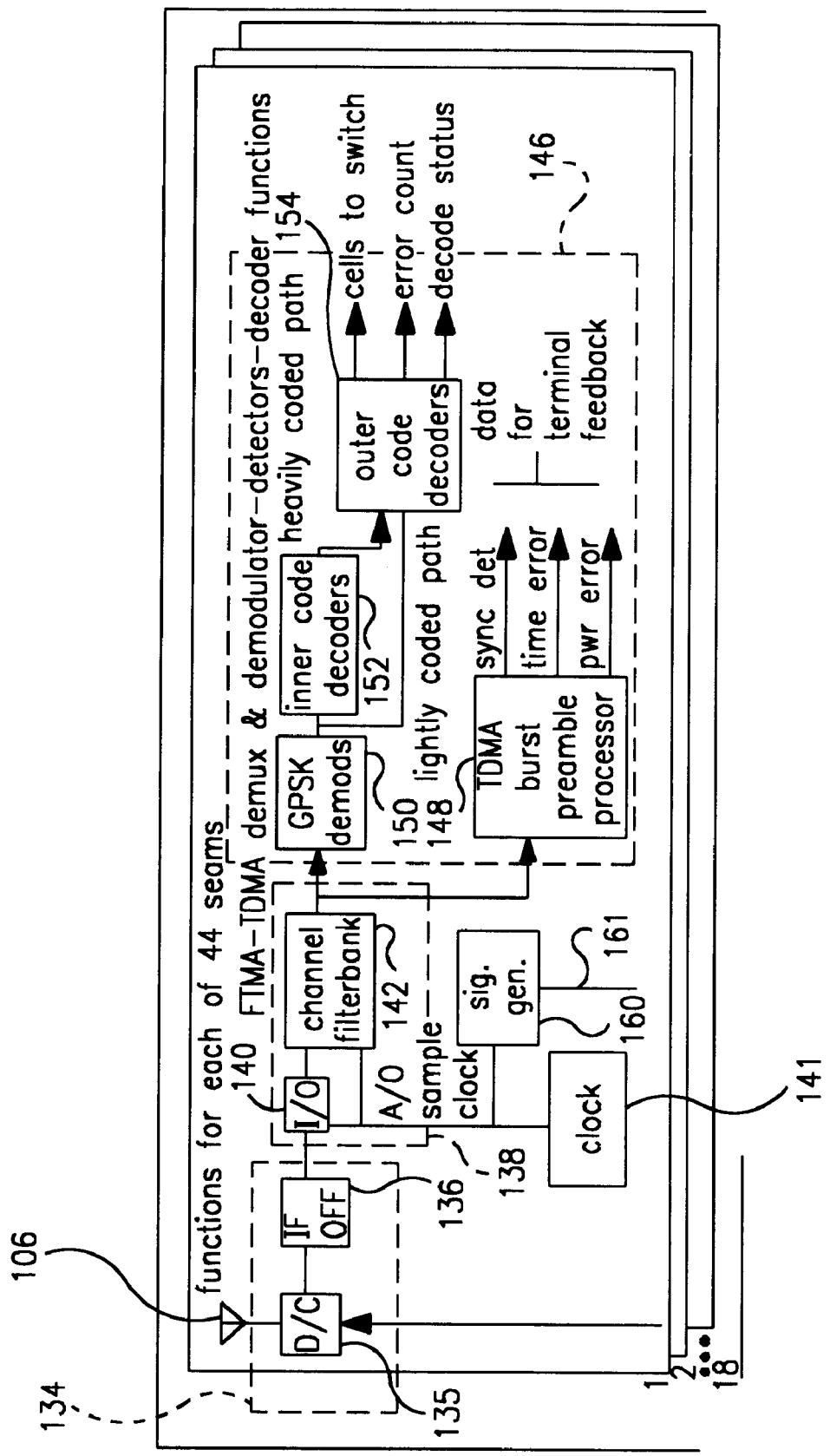
FIG. 9 is a schematic block diagram illustrating additional details of the circuitry shown in FIG. 8.

Referring still to FIG. 9, the data content borne by the multiple uplink channels in a given band is extracted by a parallel processing demodulator 138. This device begins its processing by sampling and digitizing the band signal in an analog to digital converter 140 based on clock signals from a clock 141. The sampling rate is synchronous with the intermediate frequency on which the band rides so that both the inphase (I) and quadrature (Q) components are preserved. Clock 141 also provides clock signals for timing demodulators 150 and decoders 152 and 154.

These samples are aggregated into sets of consecutive samples which are then subjected to a discrete Fourier transform (DFT) in a first channelizer 142 which resolves the 125 MHz band into 7 subbands, (X channels) and which includes integral matched filtering to the square root raised cosine shaping function. For Y and Z channels, a second channelizer follows which resolves the X channel into 5 or 25 constituents, respectively, and which also includes integral matched filtering.

Complex samples from the channelizer/matched filter are passed to a multichannel demodulator 150, a synchronization burst processor, and an initial entry processor for recovery of the baseband information content of, respectively, traffic bursts, synch bursts, and initial entry bursts (EOW). The processing action of these three processors are described in, respectively, TRW Docket No. 22-0061, filed herewith, in the name of Dominic Carrozza, et al., entitled "Synchronization Burst Processor for a Processing Satellite", U.S. patent application Ser. No. 09/270, 167, filed Mar. 16, 1999, entitled "Initial Entry Processor for a Processing Satellite", and TRW Docket No. 22-0063, filed herewith, in the name of Dominic Carrozza, et al., entitled "Uplink Demodulator Scheme for a Processing Satellite" which are incorporated by reference and which are assigned to the same assignee.

During processing of the body of the burst, the complex channelizer outputs are routed to a QPSK demodulator 150 which includes a decision directed phase locked loop which tracks the incoming channel carrier and coherently recovers the dibit data content of the 944 (or 1888) QPSK symbols in the body of the burst. The output of the demodulator 150 is in the form of I,Q soft decision pairs with 4 bits of resolution for subsequent processing by an inner code decoder 152.

Among the channel outputs from the demodulator, many of these are heavily coded channels and require processing of the inner code prior to outer code decoding. The outer code used on the satellite uplink is known as a biorthognal code consisting of 16 vectors in a space of 8 dimensions. Alternatively, it may be a Nordstrom-Robinson code consisting of a set of 256 vectors in a space of 16 dimensions, with each such vector falling on one of the vertices of a sixteen dimensional hybercube. In the following, discussion of the processing steps is limited to the biorthogonal code alternative.

The inner code decoder first aggregates a 4 component "observable" vector by buffering 4 consecutive I, Q outputs for a channel from the demodulator. The inner code decoder then locates the code vector closest (in Euclidean space) to the observable vector and assigns the related information nibble as its output. This process is known as "maximum likelihood" decoding. Decoded nibbles are aggregated in pairs to form bytes which are passed to a byte buffer to assemble a block for decoding.

In the case of lightly coded channels, the inner decoding process consists merely of extracting the hard decision (most significant bit) from the demodulator output and organizing these into bytes which are passed to a byte buffer in preparation for the outer decoder's action.

Each burst arriving in the uplink requires decoding of the (236,212) Reed-Solomon outer code. Blocks of 236 received bytes from the various uplink channels are assembled in buffer as they become available. As complete received blocks become available, the outer code decoder 154 is scheduled to decode the block. This decoding follows the standard technique for decoding any BCH code (of which the RS codes are a subset). The RS decoder performs three basic steps:

Forms a 24 byte syndrome polynomial from the 236 byte received polynomial (i.e. the received block);

Processes the syndrome polynomial using Euclid's Algorithm to produce the error locator polynomial and the error identifier polynomials; and Locates and corrects any errors among the 236 byte received block.

Whenever there are 12 or fewer byte errors in the received block, the BCH decoding method will correct all errors. The number of errors corrected is readily available when the decoding process completes normally. For almost all cases where there are more than 12 errors, there are various abnormal symptoms that are manifested by the processing steps. Such cases are known as "decoder failure". Whenever a decoder failure is sensed, the associated block is discarded since it is known to be unreliable. By design, the probability of decoder failure a few parts per million at the threshold (faded limit) for uplink operation. The probability that a block containing more than 12 errors decodes without exhibiting decoder failure is very small so that the probability that a data is received in error in the satellite system is negligible.

Upon completion of the outer code decoding, the 24 byte parity portion of the block is discarded and the 212 byte information portion is separated into four 53 byte cells which are placed at the input for the uplink band into the satellite fast cell switch 104.

Referring to FIG. 9, signal generator 160 generates a synchronizing burst timing signal on a conductor 161. The timing signal on conductor 161 is conducted to cell switch 104, is processed by blocks 118 and 110 and is transmitted on the downlink by antenna 112.

Those skilled in the art will recognize that the preferred form of the invention may be altered and modified without departing from the true spirit and scope of the invention as defined in the accompanying claims.

What is claimed is:

1. Apparatus for generating and transmitting data in an available spectrum of frequencies suitable for use by a processing communication satellite comprising in combination:

one or more earth terminals connected in order to provide data cells and a synchronizing burst timing signal;

one or more encoders connected in order to group a predetermined number of the data cells with a selectable one of a predetermined first error correction code having a first code rate and a predetermined second error correction code having a second code rate to generate data bursts and to group the data bursts with synchronizing bursts timed in response to said synchronizing burst timing signal in order to generate data frames selected from a group of data frame types, said first code rate being a multiple of said second code rate;

one or more modulators connected to modulate the data frames by a predetermined form of modulation to enable placement of the modulated data frames into a plurality of channels selected from a group of channel types having a plurality of channel rates definable in symbols per second; and one or more antennas connected to transmit the modulated data frames to the satellite over one or more beams with a predetermined form of polarization.

2. Apparatus, as claimed in claim 1, wherein said frames define multiple frequency TDMA channel slots.

3. Apparatus, as claimed in claim 1, wherein the predetermined number of data cells is four.

4. Apparatus, as claimed in claim 1, wherein the predetermined first error correction code comprises Reed-Solomon outer code.

5. Apparatus, as claimed in claim 1, wherein the predetermined second error correction code comprises a Reed-Muller code resulting in a biorthogonal signal set over four quadraphase phase shift keying channel symbols concatenated with said Reed-Solomon outer code.

6. Apparatus, as claimed in claim 1, wherein the data frame types differ by the number of data bursts transmitted per frame as a function of the channel rate.

7. Apparatus, as claimed in claim 1, wherein the data frame types differ by the number of synchronizing bursts transmitted per frame as a function of the channel rate.

8. Apparatus, as claimed in claim 1, wherein the predetermined form of modulation comprises quaternary phase shift keying modulation.

9. Apparatus, as claimed in claim 8, wherein the predetermined form of modulation further comprises square-root raised cosine pulse shaping on quaternary phase shift keying.

10. Apparatus, as claimed in claim 1, wherein the one or more modulators generates a sufficient number of different frequencies so as to allow up to a predetermined number of bands of frequencies-within the available spectrum of frequencies and generates a sufficient number of different frequencies so as to allow up to a predetermined number of channels of frequencies within each of the bands and generates a sufficient number of different frequencies so as to allow up to a predetermined number of first subohannels of frequencies or up to a predetermined number of second subchannels of frequencies within each channel.

11. Apparatus, as claimed in claim 10, wherein said channels, first subchannels and second subchannels are separated by predetermined frequency spacings and transmit symbols at predetermined symbol rates, wherein said frequency spacings and said symbol rates defined channel spacing ratios and wherein said channel spacing ratios are integer ratios.

12. Apparatus, as claimed in claim 11, wherein said channel spacing ratios are about 5/4.

13. Apparatus, as claimed in claim 10, wherein the number of bands is four, the number of channels is seven, the number of first subchannels is five and the number of second subchannels is 25.

14. Apparatus, as claimed in claim 10, wherein said channels, said first subchannels and said second subchannels each carry frames of the same duration.

15. Apparatus, as claimed in claim 1, wherein each said frame is 92–93 milliseconds in duration.

16. Apparatus, as claimed in claim 10, wherein at least some of said frames in said second subchannels carry 26 synch burst slots and 52 traffic burst slots.

17. Apparatus, as claimed in claim 16, wherein at least some of said traffic burst slots comprise a 16 symbol preamble.

18. Apparatus, as claimed in claim 10, wherein at least some of said frames in said first subchannels carry 130 synch burst slots and 260 traffic burst slots.

19. Apparatus, as claimed in claim 1, wherein at least some of said frames in said channels carry 650 synch burst slots and 1300 traffic burst slots.

20. Apparatus, as claimed in claim 19, wherein said synch burst slots comprise 64 symbols in duration and are accommodated in 74 symbol slots.

21. Apparatus, as claimed in claim 10, wherein the transmission rate in symbols per second of the first subchannels is one fifth the transmission rate of the channels in symbols per second and the transmission rate in symbols per second of the second subchannels is one twenty-fifth the transmission rate of the channels in symbols per second.

22. Apparatus, as claimed in claim 1, wherein the transmission rate of the channels is substantially 14 megasymbols per second.

23. Apparatus, as claimed in claim 1, wherein the one or more modulators shift up the generated frequencies to form carrier frequencies and wherein said beams comprise two beams each transmitted with a different form of polarization.

24. Apparatus, as claimed in claim 23, wherein the forms of polarization comprises a form of polarization selected from the group consisting of right hand circular polarization, left hand circular polarization and both right hand and left hand circular polarization.

25. Apparatus, as claimed in claim 1, wherein the one or more beams comprises a plurality of beams transmitted from a plurality of earth locations using at least some of the same carrier frequencies so that the carrier frequencies may be reused spatially by the satellite.

26. Apparatus, as claimed in claim 1, wherein the one or more modulators generate a sufficient number of different frequencies so as to allow up to a predetermined number of bands of frequencies within the available spectrum of frequencies and wherein the beams are arranged in a cluster configuration in which each beam of a cluster includes the predetermined number of bands and each band occupies a different portion of the available spectrum of frequencies.

27. Apparatus, as claimed in claim 10, wherein each of the bands is transmitted with each of two polarization's.

28. Apparatus, as claimed in claim 1, wherein one or more of the data bursts includes a coded message identifying one of the one or more terminals beginning to transmit data to the satellite.

29. A method for generating and transmitting data in an available spectrum of frequencies suitable for use by a processing communication satellite comprising the steps of:
providing data cells and a synchronizing burst timing signal at one or more earth terminals;
grouping a predetermined number of the data cells with one of a selectable predetermined first error correction code having a first code rate and a predetermined second error correction code having a second code rate to generate data bursts, said first code rate being a multiple of said second code rate;
grouping the data bursts with synchronizing bursts timed in response to said synchronizing burst timing signal to generate data frames selected from a group of data frame types;
modulating the data frames by a predetermined form of modulation to enable placement of the modulated data frames into a plurality of channels selected from a group of channel types having a plurality of channel rates definable in symbols per second; and
transmitting the modulated data frames over one or more beams with a predetermined form of polarization.

30. A method, as claimed in claim 29, wherein the data frame types differ by the number of data bursts transmitted per frame as a function of the channel rate.

31. A method, as claimed in claim 29, wherein the data frame types differ by the number of synchronizing bursts transmitted per frame as a function of the channel rate.

32. A method, as claimed in claim 29, wherein the step of modulating comprises the step of shifting up the generated frequencies to form carrier frequencies and wherein the step of transmitting comprises the step of transmitting at least two of said beams each with a different form of polarization.

33. A method, as claimed in claim 29, wherein the form of polarization comprises a form of polarization selected from the group consisting of right hand circular polarization, left hand circular polarization and both right hand and left hand circular polarization.

34. A method, as claimed in claim 29, wherein the one or more beams comprises a plurality of beams transmitted from a plurality of earth locations using at least some of the same carrier frequencies so that the carrier frequencies may be reused spatially by the satellite.

35. A method, as claimed in claim 29, wherein the step of modulating comprises the steps of generating a sufficient number of different frequencies so as to allow up to a predetermined number of bands of frequencies within the available spectrum of frequencies and wherein the step of transmitting comprises the step of arranging the one or more beams in a cluster configuration in which each beam of a cluster includes the predetermined number of bands and each band occupies a different portion of the available spectrum of frequencies.

36. A method, as claimed in claim 35, wherein the predetermined number of bands is four.

37. A method, as claimed in claim 29, wherein the step of transmitting comprises the step of transmitting at least two of said one or more beams each with a different form of polarization.

38. A method, as claimed in claim 29, wherein one or more of the data bursts includes a coded message suitable for identifying an earth terminal beginning to transmit data to the satellite.

39. A method, as claimed in claim 29, wherein the step of modulating comprises the steps of:
generating a sufficient number of different frequencies so as to allow up to a predetermined number of channels of frequencies within each of the bands; and
generating a sufficient number of different frequencies so as to allow up to a predetermined number of first subchannels of frequencies within each channel or up to a predetermined number of second subchannels of frequencies within each channel.

40. A method, as claimed in claim 39, wherein the number of channels is seven, the number of first subchannels is five and the number of second subchannels is 25.

41. A method, as claimed in claim 39, wherein the transmission rate in symbols per second of the first subchannels is one fifth the transmission rate of the channels in symbols per second and the transmission rate in symbols per second of the second subchannels is one twenty-fifth the transmission rate of the channels in symbols per second.

42. A method, as claimed in claim 39, wherein said channels, first subchannels and second sitchannels are separated by predetermined frequency spacings and transmit symbols at predetermined symbol rates, wherein said frequency spacings and said symbol rates defined channel spacing ratios and wherein said channel spacing ratios are integer ratios.

43. A method, as claimed in claim 42, wherein said channel spacing ratios are about 5/4.

44. A method, as claimed in claim 39, wherein said channels, said first subchannele and said second subchannels each carry frames of the same duration.

45. A method, as claimed in claim 44, wherein each said frame is 92–93 milliseconds in duration.

46. A method, as claimed in claim 45, wherein at least some of said frames in said second subchannels carry 26 synch burst slots and 52 traffic burst slots.

47. A method, as claimed in claim 46, wherein at least some of said traffic burst slots comprise a 16 symbol preamble.

48. A method, as claimed in claim 44, wherein at least some of said frames in said first subchannels carry 130 synch burst slots and 260 traffic burst slots.

49. A method, as claimed in claim 29, wherein at least some of said frames in said channels carry 650 synch burst slots and 1300 traffic burst slots.

50. A method, as claimed in claim 49, wherein said synch bursts comprise 64 symbols in duration and are accommodated in 74 symbol slots.

51. A method, as claimed in claim 29, wherein the transmission rate of the channels is substantially 14 megasymbols per second.

52. A method, as claimed in claim 29, wherein said frames define multiple frequency TDMA channel slots.

53. A method, as claimed in claim 29, wherein the predetermined number of the data cells is four.

54. A method, as claimed in claim 29, wherein the predetermined first error correction code comprises Reed-Solomon outer code.

55. A method, as claimed in claim 29, wherein the predetermined second error correction code comprises a Reed-Muller code resulting in a biorthogonal signal set over four quadraphase phase shift keying channel symbols concatenated with said Reed-Solomon outer code.

56. A method, as claimed in claim 29, wherein the predetermined form of modulation comprises quaternary phase shift keying modulation.

57. A method, as claimed in claim 56, wherein the predetermined form of modulation further comprises square-root raised cosine pulse shaping on quaternary phase shift keying.

* * * * *